(12) United States Patent
Umemura et al.

(10) Patent No.: US 8,896,845 B2
(45) Date of Patent: Nov. 25, 2014

(54) DEVICE FOR MEASURING THREE DIMENSIONAL SHAPE

(75) Inventors: Nobuyuki Umemura, Aichi (JP); Takahiro Mamiya, Aichi (JP); Hiroyuki Ishigaki, Aichi (JP)

(73) Assignee: CKD Corporation, Aichi (JP)

( * ) Notice: Subject to any disclaimer, the term of this patent is extended or adjusted under 35 U.S.C. 154(b) by 182 days.

(21) Appl. No.: 13/558,842

(22) Filed: Jul. 26, 2012

(65) Prior Publication Data

US 2013/0155416 A1 Jun. 20, 2013

(30) Foreign Application Priority Data

Dec. 15, 2011 (JP) ................................. 2011-273985

(51) Int. Cl.
*G01B 11/24* (2006.01)
(52) U.S. Cl.
USPC .......................................................... 356/609
(58) Field of Classification Search
None
See application file for complete search history.

(56) References Cited

FOREIGN PATENT DOCUMENTS

| JP | 2010-169433 A | 8/2010 |
| JP | 2010276607 A | 12/2010 |

OTHER PUBLICATIONS

Notification of Reasons for Refusal (Office Action) in corresponding Japanese Application No. 2011-273985 dated Nov. 19, 2013 (6 pages).

*Primary Examiner* — Tarifur Chowdhury
*Assistant Examiner* — Amanda Merlino
(74) *Attorney, Agent, or Firm* — Osha Liang LLP

(57) ABSTRACT

A device for measuring three dimensional shape is configured to perform one of a first imaging operation as imaging processing of a single operation among a multiplicity of imaging operations performed by irradiation of a first light pattern of multiply varied phases, and a second imaging operation as imaging processing of a single operation among a multiplicity of imaging operations performed by irradiation of a second light pattern of multiply varied phases. The device is configured to, simultaneous with completion of the first or second imaging operation, start shifting or switching operation of said first grating or a second grating relating to said first imaging operation. The device is configured to, without waiting for completion of the shifting or switching operation, perform the other imaging operation from among the first and second imaging operations.

8 Claims, 5 Drawing Sheets

DEVICE FOR MEASURING THREE DIMENSIONAL SHAPE

CROSS-REFERENCE TO RELATED APPLICATIONS

This application claims priority to Japanese Patent Application No. 2011-273985 filed on Dec. 15, 2011 in Japan.

BACKGROUND OF INVENTION

1. Field of the Invention

The present invention relates to a device for measuring three dimensional shape.

2. Background Art

Generally, when electronic components are mounted on a printed board, firstly cream solder is printed at certain positions on the electrode pattern. Thereafter, the electronic components are temporarily fixed to the printed board by use of viscosity of the cream solder. Thereafter, the aforementioned printed board is conveyed to a reflow furnace, the printed board is subjected to a certain reflow step, and soldering is performed. In recent years, inspection of the printed state of the cream solder has been required at a stage prior the printed board being conveyed to the reflow furnace. A device for measuring three dimensional shape is used during this inspection.

In recent years there have been various proposals for devices for measuring three dimensional shape by the use of light (so-called contact-free devices for measuring three dimensional shape). For example, technology has been proposed relating to devices for measuring three dimensional shape using the phase shift method.

A device for measuring three dimensional shape using this phase shift method uses an irradiation unit composed of a light source emitting a certain light and a grating for transformation of this light from the light source to a light pattern having a sinusoidal wave pattern (stripe-shaped pattern) to irradiate the light pattern on the object to be measured (i.e., a printed board in this case). Then, a point on the board is observed using an imaging unit disposed directly above the board. A charge-coupled device ("CCD") camera or the like composed of a lens, an imaging element, or the like is used as the imaging unit. In this case, the intensity I of light at a point P on the image plane is given by the below listed formula:

$$I = e + f \times \cos \phi$$

(within the formula, e=non-modulated light noise (offset component), f=sine wave contrast (reflectivity), and $\phi$=phase imparted by roughness of the object).

Here, due to movement or switching control of the aforementioned grating, the phase of the light pattern is changed, for example, in 4 stages as $\phi+0$, $\phi+\pi/2$, $\phi+\pi$, and $\phi+3\pi/2$. Images of the corresponding intensity distributions (I0, I1, I2, and I3, respectively) are read, and the modulated component $\alpha$ is found based on the below listed formula.

$$\alpha = \arctan\{(I3-I1)/(I0-I2)\}$$

Using this modulated component $\alpha$, the three dimensional coordinates (x, y, z) of the point P on the object to be measured, such as a cream solder or the like of a printed board, are found, and these coordinates are used to measure three dimensional shape (particularly height) of the object to be measured.

However, when using only a single aforementioned irradiation unit, shadowed parts may occur where the light pattern is irradiated on the object to be measured (measurement subject) by only one of the aforementioned irradiation units. Thus, there is concern that accurate measurement of such shadowed parts may not be possible.

In consideration of such circumstances, technology is being proposed for the performance of measurement by irradiation of light patterns from two directions in order to improve measurement accuracy or the like.

Previously, in this case, while a grating of a first irradiation unit has been shifted sequentially (or switched), an entire set of image data (e.g., 4 images of image data) has been imaged within a certain measurement subject range (image range) under illumination by a first light pattern having multiply shifted phases. Thereafter, while sequentially shifting or the like a grating of a second irradiation unit, an entire single set of image data is imaged within the aforementioned measurement subject range under illumination by a second light pattern having multiply shifted phases.

In contrast, in recent years, the second light pattern from the second irradiation unit is irradiated, and imaging is performed, while the grating of the first irradiation unit is being shifted or the like, and on the other hand, the first light pattern from the first irradiation unit is irradiated and, imaging is performed, while the grating of the second irradiation unit is being shifted or the like, so that irradiation and imaging are alternatingly repeated so that the measurement time can be shortened (for example, see the proposed technology of Patent Document 1).

[Prior Art Documents]

[Patent Document 1] Japanese Unexamined Laid-open Patent Application No. 2010-276607

However, imaging by a camera or the like is normally performed using a relatively short time interval (e.g., 2 millisecond ("msec")) under strong illumination in order to reduce the effect of mechanical vibration.

On the other hand, shifting of the grating at the irradiation unit is performed over a relatively long time interval (e.g., 20 msec) in order to avoid vibration or the like. Although a liquid crystal shutter or the like may be used as the grating, switching control of a liquid crystal shutter also requires a relatively long time interval such as that mentioned above.

Thus, according to the configuration of the aforementioned Patent Document 1, for example, assuming a total of 8 imaging operations (4 images each for each light pattern) of a certain measurement subject using two light patterns, assuming that the time interval required for a respective image is 2 msec, and assuming that the required time interval per shifting of the grating is 20 msec, then, as shown in FIG. 6, a relatively long measurement time becomes required until the completion of all processing for the certain measurement subject range (i.e., (first grating shift time interval of 20 msec+second grating shift time interval of 20 msec)×4 times=a total of 160 msec).

Furthermore, if several measurement subject ranges are set on a single printed board, then, the time interval required for measurement of this single printed board becomes severalfold longer. There is thus a need for reduction of the measurement time interval.

The aforementioned problem is not necessarily limited to the measurement of height of a cream solder or the like printed on a printed board, and the aforementioned problem is inherent to the general field of devices for measurement of three dimensional shape.

In consideration of the aforementioned circumstances, one or more embodiments of the present invention provide a device for measurement of three dimensional shape that is capable of improvement of measurement precision and reduction of the measurement time interval when performing three dimensional measurement using the phase shift method.

SUMMARY OF INVENTION

Various embodiments of the invention for addressing the above issue will be explained separately below. As may be required, the characteristic operational effects of the embodiments will also be described.

A first embodiment of the claimed invention is directed to a device for measuring three dimensional shape. The aforementioned device for measuring three dimensional shape includes a first irradiation unit having a first light source for generation of a certain light, and a first grating for transforming light from the aforementioned first light source into a first light pattern having a stripe-like light intensity distribution, so that the first irradiation unit is capable of irradiating the aforementioned first light pattern from a first position upon an object to be measured, a first grating control unit for controlling shifting or switching of the aforementioned first grating and causing multiple changes of phase of the aforementioned first light pattern irradiated from the aforementioned first irradiation unit, a second irradiation unit having a second light source for generation of a certain light, and a second grating for transforming light from the aforementioned second light source into a second light pattern having a stripe-like light intensity distribution, so that the second irradiation unit is capable of irradiating the aforementioned second light pattern from a second position upon an object to be measured, the aforementioned second position being different from the aforementioned first position, a second grating control unit for controlling shifting or switching of the aforementioned second grating and causing multiple changes of phase of the aforementioned second light pattern irradiated from the aforementioned second irradiation unit, an imaging unit capable of imaging reflected light from the aforementioned object to be measured irradiated by the aforementioned first light pattern or the aforementioned second light pattern, and an image processing unit for performance of three dimensional measurement by phase shift method based on multiple acquired sets of image data based on the aforementioned first light pattern or the aforementioned second light pattern of multiply varied phases.

The aforementioned device for measuring three dimensional shape is configured to perform a first imaging operation performed as: a no. 1 imaging operation as imaging processing of a single operation among a multiplicity of imaging operations performed by irradiation of the aforementioned first light pattern of multiply varied phases, or as a no. 2 imaging operation as imaging processing of a single operation among a multiplicity of imaging operations performed by irradiation of the aforementioned second light pattern of multiply varied phases. Then, simultaneous with completion of the aforementioned first imaging operation, the device starts shifting or switching operation of the aforementioned first grating or the aforementioned second grating relating to the aforementioned first imaging operation. Then, without waiting for completion of the aforementioned shifting or switching operation, the device performs a second imaging operation from among the aforementioned no. 1 and no. 2 imaging operations. The aforementioned second imaging operation differs from the aforementioned first imaging operation.

According to the first embodiment of the claimed invention, by irradiation of light patterns from two directions, as much as possible, the occurrence of a shadowed part non-irradiated by a light pattern is prevented on the object to be measured. As a result, the accuracy of measurement may be improved.

Moreover, according to the first embodiment, a configuration results that is capable of a first imaging operation that is performed as one of the following: a single instance of the no. 1 imaging operation using the first light pattern, or a single instance of the no. 2 imaging operation using the second light pattern; and after completion of the aforementioned first imaging operation, the grating shift or the like relating to the aforementioned first imaging operation may start, and without waiting for completion of shifting or the like of the aforementioned grating, the other imaging operation among both of the aforementioned imaging operations may be executed.

That is, a configuration results that is capable of executing a no. 1 imaging operation that is a single operation among multiple imaging operations performed by irradiating the aforementioned multiple first light patterns having different phases, and after completion of the aforementioned no. 1 imaging operation, starting shifting or switching operation of the aforementioned first grating; and without waiting for completion of shifting or switching of the aforementioned first grating, performing execution of a no. 2 imaging operation that is a single operation among multiple imaging operations performed by irradiating the aforementioned multiple second light patterns having different phases; and after completion of the aforementioned no. 2 imaging operation, starting shifting or switching of the aforementioned second grating, and performing the aforementioned no. 1 imaging operation without waiting for completion of shifting or switching of the aforementioned second grating.

In this manner, without waiting from completion of shifting or the like of one of the gratings, imaging using the other grating as well as shifting or the like of the grating after such imaging is performed. Thus, it becomes possible to overlap part of the two grating shift operations, which required relative long time intervals. As a result, there may be a reduction in the time required until acquisition of all image data required for performing three dimensional measurement within a certain range on the object to be measured.

A second embodiment of the claimed invention is directed to the device for measuring three dimensional shape according to the first embodiment of the claimed invention, where the aforementioned device for measuring three dimensional shape is capable of, simultaneous with completion of the aforementioned first imaging operation among the aforementioned both imaging operations, starting shifting or switching operation of the aforementioned first grating or the aforementioned second grating relating to the aforementioned first imaging operation, and also starting the aforementioned second imaging operation among both aforementioned imaging operations.

According to the second embodiment of the claimed invention, simultaneous with the start of shifting or switching of the aforementioned first grating, the aforementioned no. 2 imaging operation may be started; and simultaneous with the completion of the aforementioned no. 2 imaging operation, the aforementioned no. 1 imaging operation may be started. As a result, it is possible to further increase the aforementioned operational effect of the first embodiment of the claimed invention, and it is possible to further reduce the time required for measurement.

For example, within a certain range of the object to be measured, if two light patterns are used for imaging of a total of 8 times (4 times each for both of the light patterns), if the time interval required for a single imaging is 2 msec, if the time required for a single shifting or switching of a grating is 20 msec, then, the second embodiment of the claimed invention requires a total of 90 ms until completion of processing relating to a certain range of the object to be measured ((imaging time of the first light pattern irradiation time (2 msec)+ (imaging time of the second light pattern irradiation time (2 msec)+second grading shift time (20 msec))×4 times=total of 90 msec). That is, a reduction (70 msec, about 44%) becomes possible in comparison to the configuration of the aforementioned Patent Document 1, which alternatingly shifts or the like the first grating and second grating.

A third embodiment of the claimed invention is directed to the device for measuring three dimensional shape according to the first or second embodiment of the claimed invention; where positional relationship between the aforementioned imaging unit and the aforementioned object to be measured is fixed at least during each of the aforementioned imaging operations.

According to the third embodiment of the claimed invention, during imaging, there is no change of the positional relationship between the imaging unit and the object to be measured. Thus, it is possible to prevent narrowing of the measurement range of the object to be measured. As a result, it is possible to shorten the time interval required for measurement of the entire object to be measured, such as a printed board or the like that has had set multiple measurement ranges.

A fourth embodiment of the claimed invention is directed to the device for measuring three dimensional shape according to any one of the first through third embodiments of the claimed invention; where the aforementioned first light pattern is a light pattern of a first pitch; and the aforementioned second light pattern is a light pattern of a second pitch differing from the aforementioned first pitch (e.g., the second pitch is longer than the first pitch).

The fourth embodiment of the claimed invention makes possible the realization of two effects, i.e., the possibility of increasing the height range capable of measurement (an advantage of use of a light pattern having a long pitch (e.g., the second light pattern)), and the possibility of measurement with higher precision (an advantage of use of a light pattern having a short pitch (e.g., the first light pattern)). As a result, high resolution measurement may be performed over a wide dynamic range, and it is possible to realize measurement of higher precision.

Other aspects and advantages of the invention will be apparent from the following description and the appended claims.

DETAILED DESCRIPTION

One or more embodiments of the claimed invention will be explained below while referring to figures.

Figure 1:
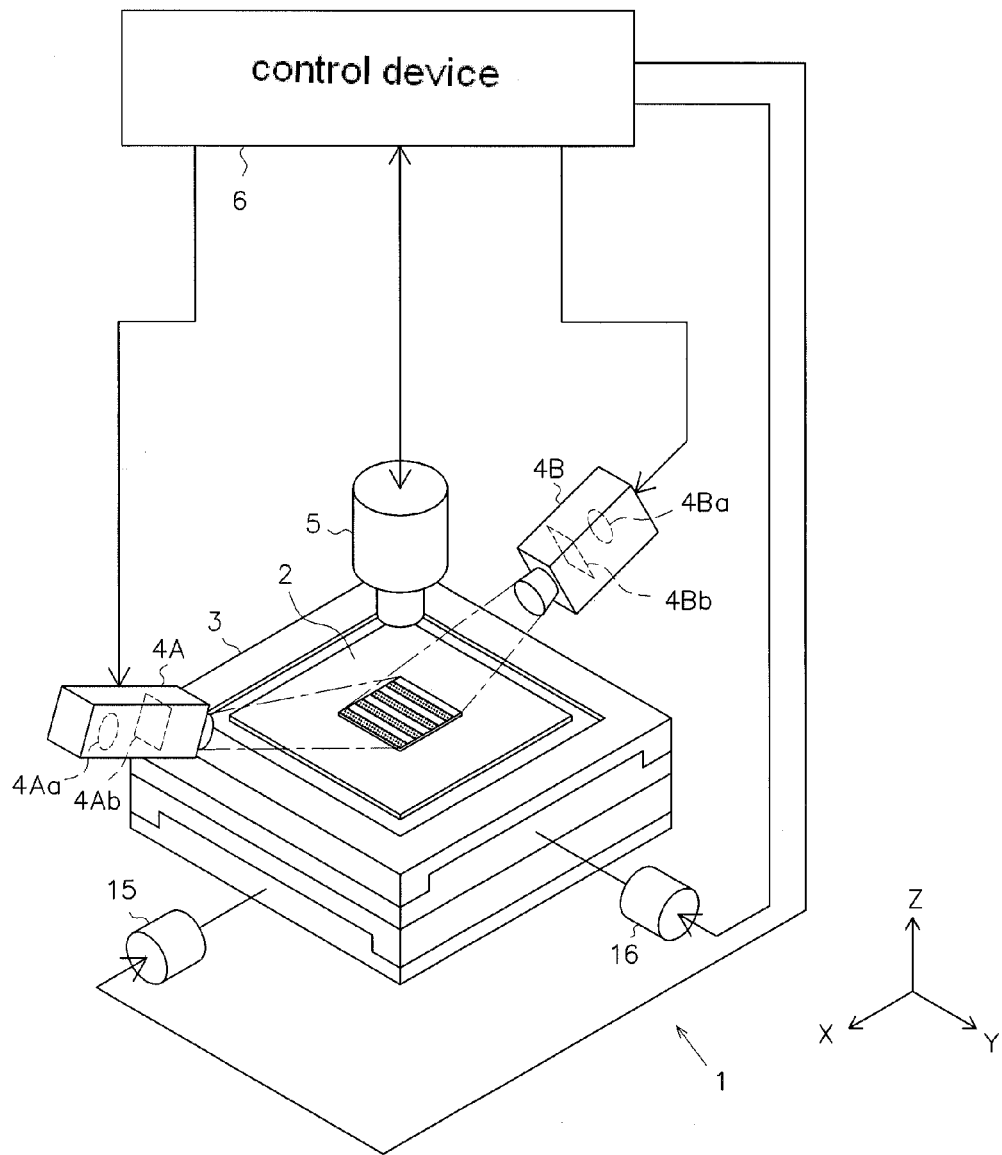
FIG. 1 is a schematic tilted perspective view roughly showing the board inspection device according to one or more embodiments of the present invention.

FIG. 1 is a rough structural drawing showing schematically a board inspection device 1 equipped with the device for measuring three dimensional shape of the present embodiment. As shown in this figure, the board inspection apparatus 1 is equipped with a carrying stage 3 for carrying a printed board 2 as an object to be measured produced by printing cream solder as the measurement subject, two irradiation devices (i.e., first irradiation device 4A as the first irradiation unit, and second irradiation device 4B as the second irradiation unit) for irradiation of a certain light pattern from above at a tilted angle upon the surface of the printed board 2, a camera 5 as an imaging unit for imaging the irradiated part of the printed board 2, and a control device 6 for execution of various types of control within the board inspection apparatus 1 and for image processing and calculation processing. The control device 6 is composed by the image processing unit in the present embodiment.

The first irradiation device 4A is provided with a first light source 4Aa for generation of a certain light and a first liquid crystal shutter 4Ab for forming a first grating for conversion of the aforementioned light from the first light source 4Aa into a first light pattern that has a striped light intensity distribution. The striped first light pattern of a phase that changes in increments of ¼ pitch can be irradiated from above at a titled angle toward the printed board 2. Here, the mechanism that performs switching control of the grating state of the liquid crystal shutter 4Ab corresponds to the first grating control unit.

Similarly, the second irradiation device 4B is provided with a second light source 4Ba for generation of a certain light and a second liquid crystal shutter 4Bb for forming a second grating for conversion of the aforementioned light from the second light source 4Ba into a second light pattern that has a striped light intensity distribution. The striped second light pattern of a phase that changes in increments of ¼ pitch can be irradiated from above at a titled angle toward the printed board 2. Here, the mechanism that performs switching control of the grating state of the liquid crystal shutter 4Bb corresponds to the second grating control unit.

More specifically, each irradiation device 4A and 4B has a pair of light collection lenses to which light generated by the light source 4Aa or 4Ba is conducted for producing parallel light. This parallel light passes through the liquid crystal shutter 4Ab or 4Bb and is conducted to a projection lens. Then, the striped light pattern is irradiated from the projection lens onto the printed board 2. By use of the liquid crystal shutter 4Ab or 4Bb of the respective irradiation device 4A or 4Bb, a striped light pattern may be produced that has a light intensity approaching that of the ideal sine wave. Thus, measurement resolution of three dimensional measurement improves. Moreover, phase shift control of the light pattern may be performed electronically, and the control system may be made compact.

Moreover, each of the irradiation devices 4A and 4B is set so as to irradiate each light pattern along the x-axis direction parallel to a pair of sides of the rectangular shaped printed board 2. That is, the stripes of the light pattern are irradiated orthogonally to the x-axis direction, i.e., parallel to the y-axis direction.

Moreover, the irradiation devices 4A and 4B are disposed at opposing positions so as to sandwich the printed board 2 therebetween in a planar view (x-y plane) as seen by looking in the imaging direction of the camera 5 (i.e., approximately vertical direction, z-axis direction). Here, the position of placement of the first irradiation device 4A corresponds to the first position of the present embodiment, and the position of placement of the second irradiation device 4B corresponds to the second position.

Motors 15 and 16 are provided for the carrying stage 3. The printed board 2 is carried on the carrying stage 3 and is slid in an arbitrary direction (x-axis direction and y-axis direction) according to drive control by the control device 6.

The camera 5 is composed of a lens, an imaging element, or the like. A complementary metal-oxide-semiconductor ("CMOS") sensor is used as the imaging element. Of course, the imaging element is not limited to this type of imaging element, and for example, a CCD sensor the like imaging element may be adopted.

Figure 2:
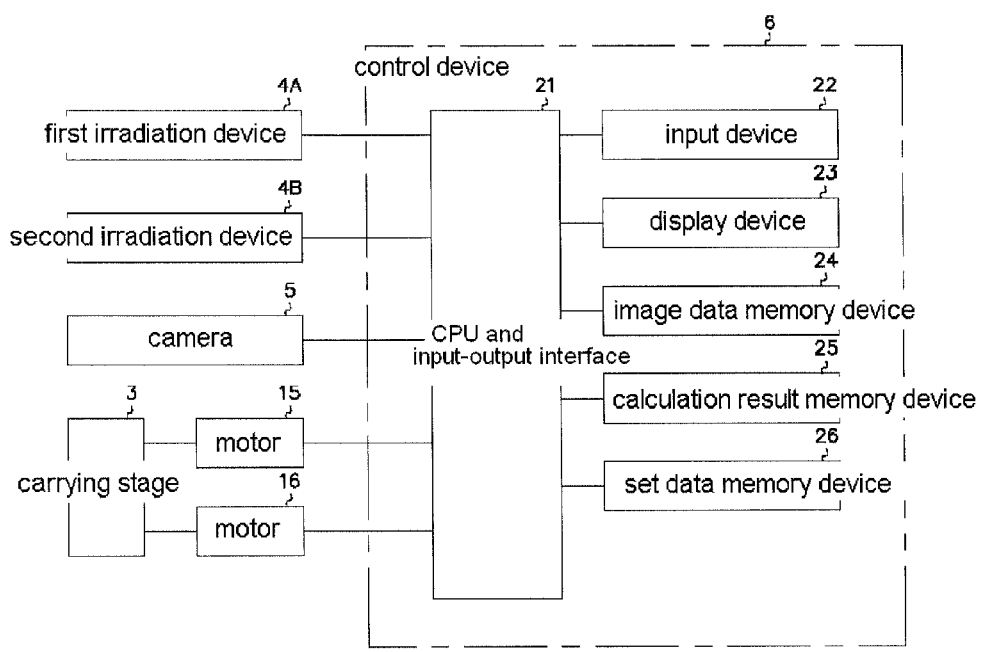
FIG. 2 is a block diagram showing the electrical configuration of the board inspection device according to one or more embodiments of the present invention.

The electronic configuration of the control device 6 will be explained next. As shown in FIG. 2, the control device 6 is equipped with: a central processing unit ("CPU") and input-output interface 21 for performing overall control of the board inspection device 1; an input device 22 as an input unit composed of a keyboard, mouse, or touch panel; a display device 23 as a display unit that has a cathode ray tube ("CRT"), liquid crystal display, or the like display screen; an image data memory device 24 for memory of image data or the like based on imaging by the camera 5; a calculation result memory device 25 for memory of each type of calculation result; and a set data memory device 26 for storing various types of information beforehand. Furthermore, each of these devices 22 through 26 communicates electrically with the CPU and the input-output interface 21.

Figure 3:
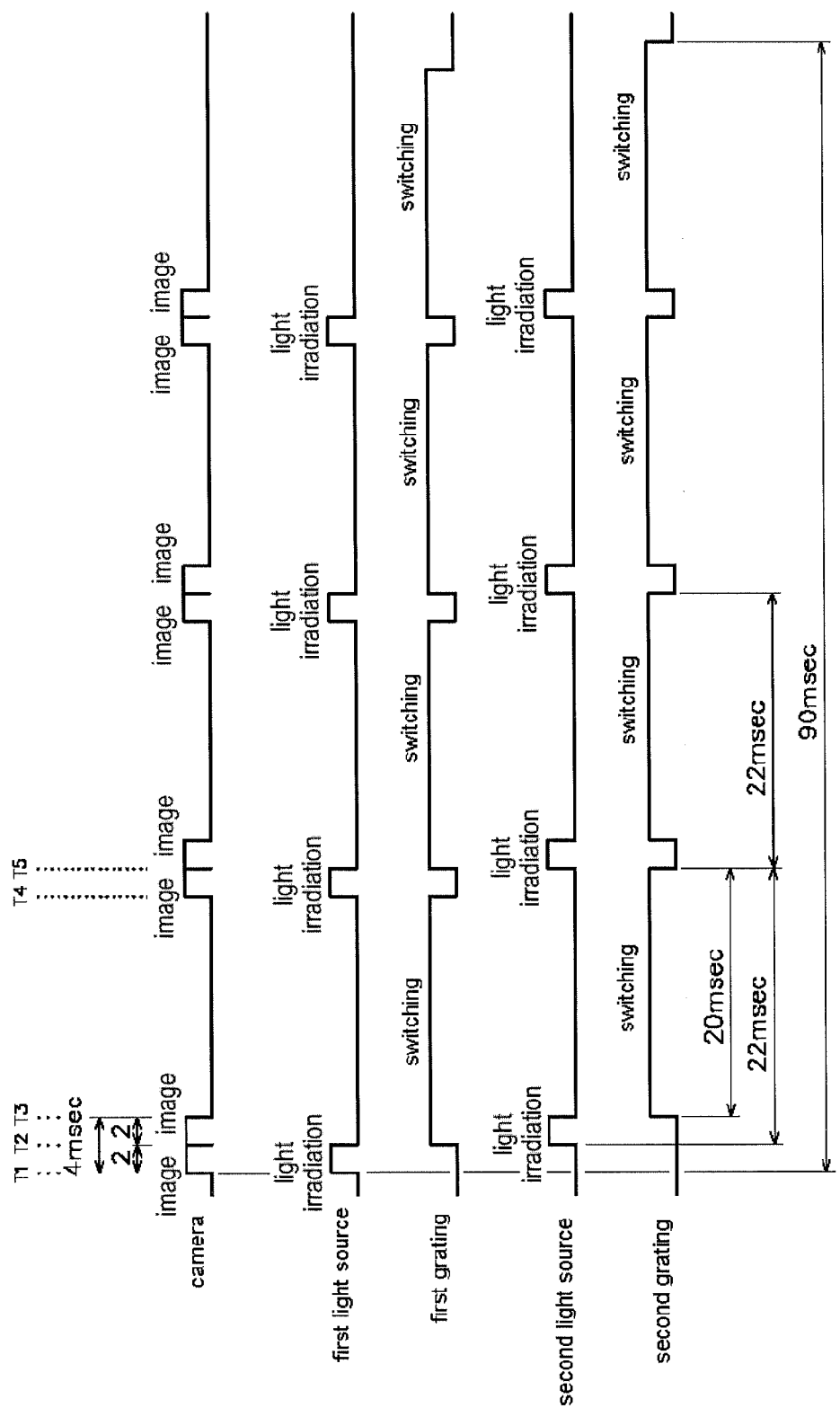
FIG. 3 is a timing chart for explanation of the operating process of the camera and irradiation device according to one or more embodiments of the present invention.

The procedure of three dimensional measurement processing executed by the control device 6 will be explained below in detail while referring to the timing chart of FIG. 3.

The control device 6 performs drive control of the motors 15 and 16 to cause movement of the printed board 2 so as to align a certain inspection area (measurement subject range) on the printed board 2 with the field of view of the camera 5. Surface of the printed board 2 is sub-divided beforehand into areas, each of a unit size that is the same as the size of the field of view of the CCD camera 5, and the inspection area is one area within the sub-divided surface area of the printed board 1.

Accordingly, the control device 6 performs switching control of the liquid crystal shutters 4Ab and 4Bb of both irradiation devices 4A and 4B, and the positions of the first grating and the second grating formed by these liquid crystal shutters 4Ab and 4Bb are set to certain standard positions.

When switching setting of the first grating and the second grating is complete, the control device 6 starts the no. 1 imaging operation at a certain time T1. Specifically, the first light source 4Aa of the first irradiation device 4A is made to irradiate light to start irradiation of the first light pattern, the camera 5 is controlled and driven, and imaging begins of the inspection area part irradiated by this first light pattern.

Then, after a certain time interval (2 msec in the present embodiment) has passed since the start of imaging, the control device 6 stops the no. 1 imaging operation at a time T2. That is, in addition to stopping irradiation of the first light pattern, the first instance of imaging according to this first light pattern is ended. The image data imaged by the camera 5 are sent to the image data memory device 24 and are stored.

Thereafter, the control device 6 starts the no. 2 imaging operation at a time T2 simultaneous with completion of the aforementioned no. 1 imaging operation. Specifically, the second light source 4Ba of the second irradiation device 4B is made to irradiate light to start irradiation of the second light pattern, the camera 5 is controlled and driven, and imaging begins of the inspection area part irradiated by this second light pattern.

Then, simultaneously at the time T2, the control device 6 starts switching processing of the first liquid crystal shutter 4Ab of the first irradiation device 4A. Specifically, from the aforementioned standard position, the position of the first grating formed by the first liquid crystal shutter 4Ab is switched to a second position that is displaced by ¼ pitch ($\pi/2$) from the phase of the first light pattern.

Then, at a certain time interval after start of the aforementioned no. 2 imaging operation (2 msec in the present embodiment), the control device stops the no. 2 imaging operation at a time T3. That is, irradiation of the second light pattern is completed, and the first instance of imaging according to this second light pattern is completed.

Moreover, the control device 6, simultaneous with the completion of the aforementioned no. 2 imaging operation, starts switching processing of the second liquid crystal shutter 4Bb of the second irradiation device 4B at a time T3. Specifically, position of the second grating forming the second liquid crystal shutter 4Bb is shifted from the aforementioned standard position to a second position displaced in phase from the second pattern by ¼ pitch ($\pi/2$).

Then, after a certain time interval has passed (20 msec in the present embodiment) after the start of the aforementioned switching operation of the first liquid crystal shutter 4Ab, at a time T4, this switching operation is completed.

In the same manner, after a certain time interval has passed (20 msec in the present embodiment) after the start of the aforementioned switching operation of the second liquid crystal shutter 4Bb, at a time T4, this switching operation is completed. Thereafter, similar processing is repeated multiple times at the aforementioned times T1 through T5.

That is, simultaneous with completion of the aforementioned switching processing of the first liquid crystal shutter 4Ab, at a time T4, the control device starts the second instance of the no. 1 imaging operation using the first light pattern displaced by ¼ pitch from that used during the aforementioned first instance of the no. 1 imaging operation. Then, at a time T5 that is 2 msec later, this second instance of the no. 1 imaging operation is completed.

After completion of the aforementioned switching processing of the second liquid crystal shutter 4Bb, and simultaneous with completion of the aforementioned second instance of the no. 1 imaging operation, at a time T5, the control device 6 starts the second instance of the no. 2 imaging operation using the second light pattern displaced by ¼ pitch from the aforementioned second light pattern used during the aforementioned first instance of the no. 2 imaging operation.

In this manner, by repeating 4 times the aforementioned series of operations, it is possible to acquire all image data (4 images each according to the present embodiment, a total of 8 images of image data) required for performing three dimensional measurement for a certain inspection area.

Then, based on 4 sets of image data acquired based on the light pattern irradiations using 4 phase shifts, the control device 6 performs height measurement (three dimensional measurement) based on the widely known phase shift method mentioned above in the description of related art.

The measurement data for each of the inspection areas obtained in this manner are stored by the calculation result memory device 25 of the control device 6. Then, based on the such measurement data for each of the inspection areas, the printing range of cream solder that became higher than a standard surface is detected, and based on integration of height at each position within this range, the volume of the printed cream solder is calculated. Then, a determination is made by comparison of standard data stored beforehand in the set data memory device 26 with data such as position, surface area, height, amount, or the like of the cream solder determined in this manner. A pass-fail determination is made of the printed state of the cream solder in this inspection area based on whether or not this comparison determination result is within a permissible range.

During performance of this processing, the control device 6 controls and drives the motors 15 and 16, causes movement of the printed board 2 to the next inspection area, and thereafter repeats the aforementioned series of processing for all inspection areas.

Due to the present embodiment in the aforementioned manner, by irradiation of light patterns from 2 directions, the occurrence of shadowed parts, where a light pattern is not irradiated on the printed board 2, may be prevented as much as possible. As a result, measurement accuracy may be improved.

Moreover, according to the present embodiment, a configuration results where a first imaging operation is executed as either a single instance of the no. 1 imaging operation using the first light pattern or as a single instance of the no. 2 imaging operation using the second light pattern; and simultaneous with the completion of this first imaging operation, switching operation of the liquid crystal shutter 4Ab or 4Bb used in this first imaging operation is started, and without waiting for completion of this switching operation, among both imaging operations, the second imaging operation is executed.

In this manner, without waiting for completion of the switching operation of the one of the liquid crystal shutters 4Ab or 4Bb, imaging using the other liquid crystal shutter 4Ab or 4Bb, and further switching operation of the liquid crystal shutter 4Ab or 4Bb after such imaging, are performed. Thus, it becomes possible to overlap part of the switching operations of the two liquid crystals shutters 4Ab and 4Bb, which require a relatively long time interval.

Thus, it becomes possible to reduce the time interval required until acquisition of all image data required for performing three dimensional measurement within a certain range, and it becomes possible to attain higher precision measurement during a shorter time interval.

For example, the time required until completion of all processing by the present embodiment for a certain inspection area becomes 90 msec (time required for the no. 1 imaging operation (2 msec)+(time required for the no. 2 imaging operation (2 msec)+time required for switching the no. 2 grating (20 msec))×4 times=90 msec)

Furthermore, movement of the printed board 2 is halted at least during the time interval during which data are acquired for the certain inspection area (i.e., during the time interval of each of the aforementioned imaging operations), and the positional relationship between the camera 5 and the printed board 2 is fixed. That is, since the positional relationship between the camera 5 and the printed board 2 during imaging does not change, it is possible to prevent reduction of size or the like of the inspection area. As a result, the measurement time interval may be shortened for measurement of a printed board 2 that has multiple sets of inspection areas as in the present embodiment.

Moreover, the described details of the aforementioned embodiment are not limiting, and for example, modifications such as the following may be used. Of course, the below described embodiments are illustrative. Of course, other modified examples and example applications are possible.

(a) The board inspection device 1 of the aforementioned embodiment used a device for measurement of three dimensional shape to measure height of the cream solder formed by printing on a printed board 2. However, this embodiment is not limiting, and a configuration may be used that measures height of a different object such as a solder bump printed on a board, an electronic component mounted on a board, or the like.

(b) The phase shift method of the aforementioned embodiment is configured for causing ¼th pitch increment changes of the phase of the light pattern. However, this configuration is not limiting, and a configuration may be adopted that varies phase of the light pattern in increments of ⅓rd pitch.

(c) According to the aforementioned embodiment, the gratings for conversion of the light from the light source 4Aa and 4Ba into striped light patterns were formed using the liquid crystal shutters 4Ab and 4Bb, and phase shifting of the light pattern was caused by switching control of these liquid crystal shutters 4Ab and 4Bb. However, this configuration is not limiting, and a configuration may be adopted, for example, that causes phase shifting of the light pattern by shifting of a grating component by a shifting means such as a piezoelectric actuator or the like.

(d) According to the aforementioned embodiment, although nothing in particular was said about the wavelengths of the light sources 4Aa and 4Ba, a configuration may be adopted in which the wavelengths of the light sources 4Aa and 4Ba are different from one another. For example, a light source emitting light having a first wavelength component (red colored component) may be adopted as the first light source 4Aa, and a light source emitting light having a second wavelength component (green colored component) may be adopted as the second light source 4Ba.

(e) Although the imaging operation of the camera 5 according to the aforementioned embodiment was described only as "imaging," more specifically, such imaging operation is categorized as the exposure processing that occurs during the actual imaging, and the transfer processing of the imaged data.

Figure 4A:
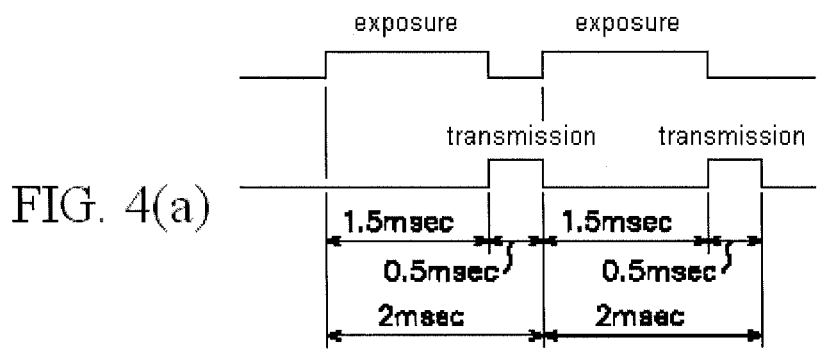
FIGS. 4(a)-4(c) are timing charts for explanation of the operating process relating to camera exposure and data transfer according to one or more embodiments of the present invention.
Figure 4B:
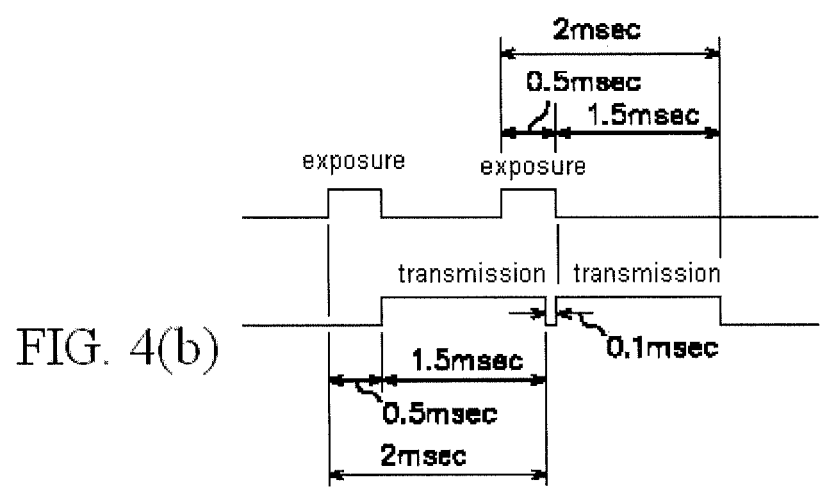
Figure 4C:
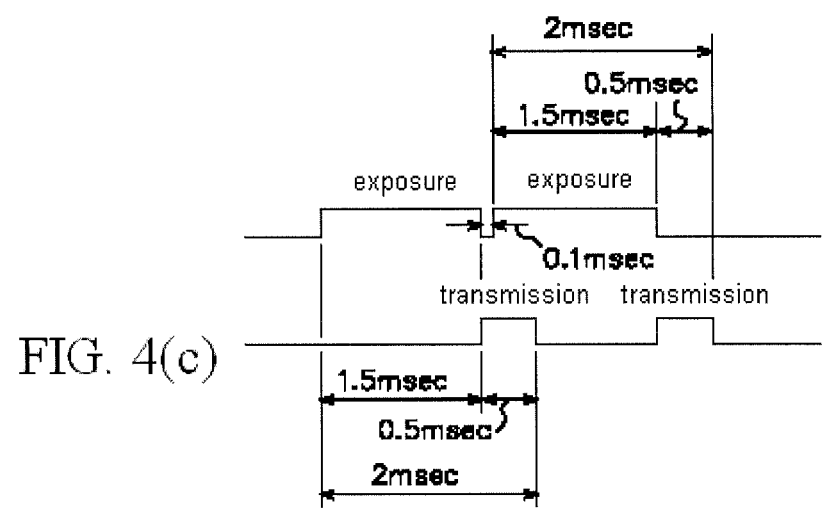
Figure 5:
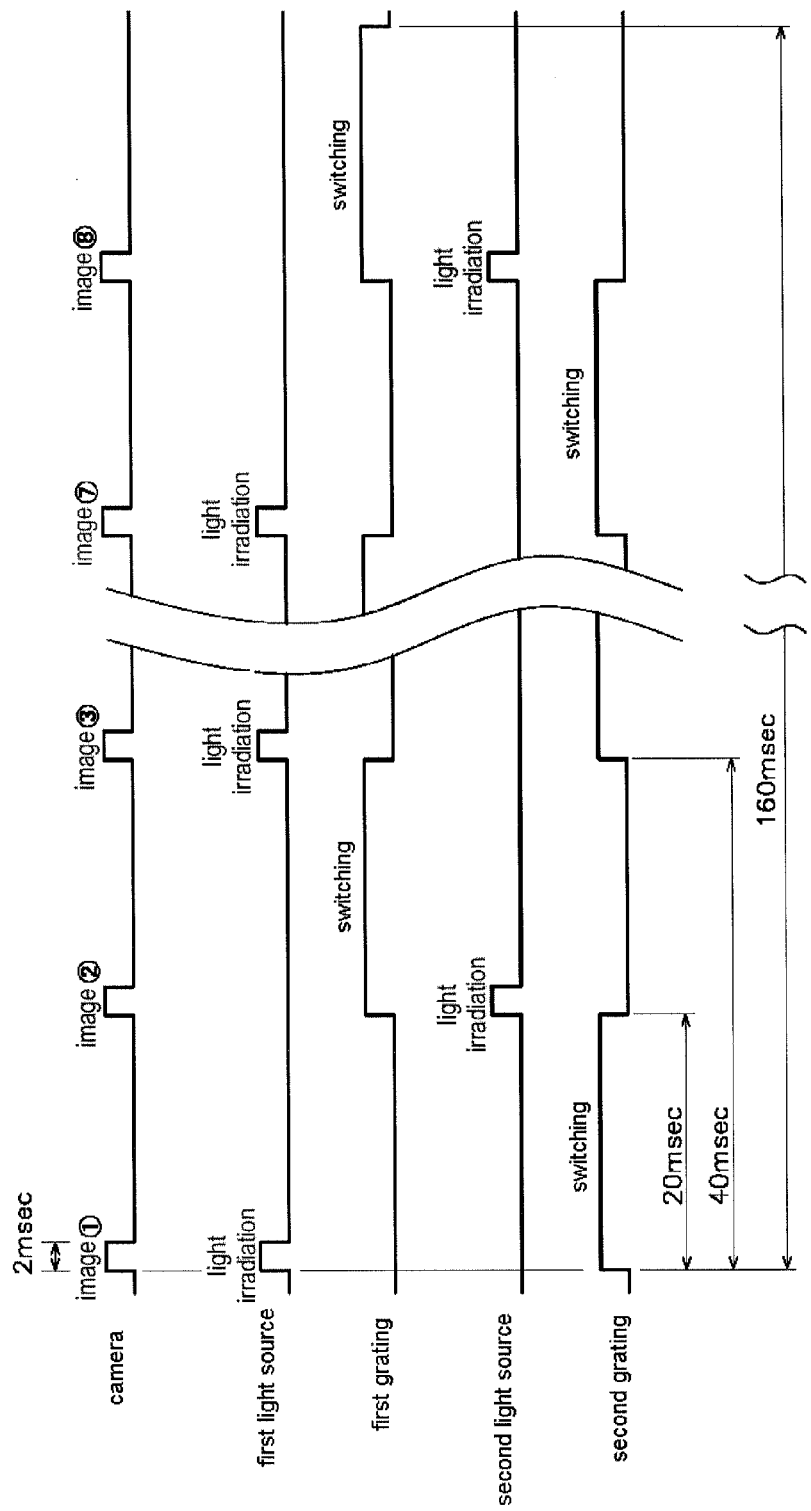
FIG. 5 is a timing chart for explanation of the operating process of a conventional camera and irradiation device according to one or more embodiments of the present invention.

Therefore, when a general CCD camera or the like is used as the camera 5, due to the inability to send data during the exposure, when the no. 1 imaging operation and no. 2 imaging operation are performed sequentially as in the aforementioned embodiment, the exposure processing and the data transfer processing become alternatingly repeated as per the example shown in FIG. 4(*a*).

In contrast, when a CMOS camera or a CCD camera or the like having a function capable of exposure during data transfer is used, it is possible to overlap part of the exposure processing and data transfer processing. Therefore, it is possible to reduce the imaging time and, thus, the measurement time.

Specifically, when the exposure time is set shorter than the data transfer time, as per the example shown in FIG. 4(*b*), during the first data transfer of data acquired by the first exposure, at a time when the second exposure barely remains unfinished, if the second data transfer begins, then, while preventing loss of the data that were acquired by the first exposure, it is possible to shorten as much as possible the imaging time interval required for the no. 1 imaging operation and no. 2 imaging operation.

On the other hand, if the exposure time interval is set longer than the data transfer time, then, as per the example shown in FIG. 4(*c*), if the second exposure is started immediately after completion of the first exposure, it is possible to shorten as much as possible the imaging time interval required for the no. 1 imaging operation and no. 2 imaging operation.

(f) Although the aforementioned embodiment resulted in a configuration that starting the no. 2 imaging operation simultaneously with finishing of the no. 1 imaging operation, this timing is not limiting. For example, a configuration may be adopted where, after completion of the no. 1 imaging operation, the no. 2 imaging operation is started after a certain time interval (e.g., 1 msec) has passed.

Similarly, according to the aforementioned embodiment, a configuration resulted that started the switching operation of the first liquid crystal shutter 4Ab (second liquid crystal shutter 4Bb) simultaneous with completion of the no. 1 imaging operation (no. 2 imaging operation).

However, this configuration is not limiting, and for example, a configuration may be adopted where after completion of the no. 1 imaging operation, and after a further certain time interval has passed (e.g., 1 msec), the switching operation of the first liquid crystal shutter 4Ab begins.

(g) Although nothing in particular was said about the pitch (stripe pitch) of each light pattern according to the aforementioned embodiment, a configuration may be adopted where the pitch of each light pattern is different. For example, a light pattern of a first pitch (e.g., 600 μm) may be adopted for the first light pattern, and a light pattern of a second pitch (e.g., 800 μm) longer than the aforementioned first pitch may be adopted for the second pattern. If measurement is carried out in this manner by combining a first light pattern having a short pitch with a second light pattern having a long pitch, it is possible to obtain two effects, i.e., increasing the height of the range capable of measurement (i.e., an advantage of use of the second light pattern having a long pitch), and realizing highly precise measurement (i.e., an advantage of the use of the first light pattern having a short pitch). As a result, it is possible to perform measurement at high resolution over a wide dynamic range, and measurement of increased precision can be realized.

Here, the present invention is not limited to a single type of pitch from a single direction, but rather a configuration may be adopted where irradiation uses the same type of light pattern (i.e., same pitch) from multiple directions. For example, a first irradiation device 4A and a second irradiation device 4B may be opposingly disposed as in the aforementioned embodiment, and a configuration may be adopted that provides two such pairs of devices so that 4 such irradiation devices 4A and 4B are disposed at 90° intervals centered on the printed board 2.

However, using this configuration, a region might possibly arise where either the first light pattern or the second light pattern is not irradiated.

In contrast, for example, a configuration may be used in which a pair of the first irradiation devices 4A and a pair of the second irradiation devices 4B are provided, the first irradiation device 4A and the second irradiation device 4B being alternatingly disposed with a 90° gap therebetween with the printed board 2 at the center (i.e., the two first irradiation devices 4A are opposingly deposed, and the two second irradiation devices 4B are opposingly deposed).

Due to this configuration, the proportion of a region where either the first light pattern or the second light pattern is not irradiated can be decreased as much as possible. As a result, it is possible to perform measurement of higher accuracy.

(h) According to the aforementioned embodiment, each of the light patterns was irradiated along the x-axis direction parallel to a pair of sides of the rectangular shaped printed board 2. That is, the resultant configuration irradiated the lines of the light pattern orthogonally relative to the x-axis direction, i.e., parallel to the y-axis direction. This configuration is not limiting, and for example, a configuration may be adopted that irradiates the light patterns such that the stripes of the light pattern intersect with each side of the rectangular printed board 2 or the camera 5 imaging field (inspection area) at a tilted angle (e.g., 45° as seen in planar view).

(i) According to the aforementioned embodiment, in a planar view (x-y plane) as viewed in roughly the vertical direction (i.e., the imaging direction of the camera 5, z-axis direction), the irradiation devices 4A and 4B are opposingly positioned so as to sandwich the printed board 2 therebetween and are positioned at equal distances in the planar view from the central printed board 2. However, this configuration is not limiting, and the placement of the irradiation devices 4A and 4B may be set arbitrarily according to configuration of the printed board 2 or the like so that there is no occurrence of shadowed parts that are non-irradiated by each of the light patterns.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Description of Reference Characters
1 . . . board inspection device
2 . . . printed board
4A . . . first irradiation device
4Aa . . . first light source
4Ab . . . first liquid crystal shutter
4B . . . second irradiation device
4Ba . . . second light source
4Bb . . . second liquid crystal shutter
5 . . . camera
6 . . . control device

What is claimed is:
1. A device for measuring three dimensional shape, the device comprising:
a first irradiation unit having a first light source for generation of a certain light, and a first grating for transforming light from said first light source into a first light pattern having a stripe-like light intensity distribution, so that the first irradiation unit is capable of irradiating said first light pattern from a first position upon an object to be measured;
a first grating control unit configured to control shifting or switching of said first grating and causing multiple changes of phase of said first light pattern irradiated from said first irradiation unit;
a second irradiation unit having a second light source for generation of a certain light, and a second grating for transforming light from said second light source into a second light pattern having a stripe-like light intensity distribution, so that the second irradiation unit is capable of irradiating said second light pattern from a second position upon an object to be measured, said second position being different from said first position;
a second grating control unit configured to control shifting or switching of said second grating and causing multiple changes of phase of said second light pattern irradiated from said second irradiation unit;
an imaging unit configured to image reflected light from said object to be measured irradiated by said first light pattern or said second light pattern;
and an image processing unit configured to perform three dimensional measurement by phase shift method based on multiple acquired sets of image data based on said first light pattern or said second light pattern of multiply varied phases;

wherein said device for measuring three dimensional shape is configured to perform one of a first imaging operation as imaging processing of a single operation among a multiplicity of imaging operations performed by irradiation of said first light pattern of multiply varied phases, and a second imaging operation as imaging processing of a single operation among a multiplicity of imaging operations performed by irradiation of said second light pattern of multiply varied phases;

wherein the device is configured to, simultaneous with completion of said first imaging operation, start shifting or switching operation of said first grating relating to said first imaging operation;

wherein the device is configured to, simultaneous with completion of said second imaging operation, without waiting for completion of said shifting or switching operation of said first grating relating to said first imaging operation, start shifting or switching operation of said second grating relating to said second imaging operation;

wherein the device is configured to, simultaneous with completion of shifting or switching operation of said first grating relating to said first imaging operation, perform said first imaging operation again; and wherein time required for said shifting or switching operation of said first grating or said second grating is longer than time required for said first imagings or said second imaging operation.

2. The device for measuring three dimensional shape according to claim 1, wherein said device for measuring three dimensional shape, simultaneously with completion of said first imaging operation among both said imaging operations, starts shifting or switching operation of said first grating or said second grating relating to said first imaging operation, and also starts said second imaging operation among both said imaging operations.

3. The device for measuring three dimensional shape according to claim 1, wherein positional relationship between said imaging unit and said object to be measured is fixed at least during each of said imaging operations.

4. The device for measuring three dimensional shape according to claim 2, wherein positional relationship between said imaging unit and said object to be measured is fixed at least during each of said imaging operations.

5. The device for measuring three dimensional shape according to claim 1, wherein said first light pattern is a light pattern of a first pitch, and wherein said second light pattern is a light pattern of a second pitch differing from said first pitch.

6. The device for measuring three dimensional shape according to claim 2, wherein said first light pattern is a light pattern of a first pitch, and wherein said second light pattern is a light pattern of a second pitch differing from said first pitch.

7. The device for measuring three dimensional shape according to claim 3, wherein said first light pattern is a light pattern of a first pitch, and wherein said second light pattern is a light pattern of a second pitch differing from said first pitch.

8. The device for measuring three dimensional shape according to claim 4, wherein said first light pattern is a light pattern of a first pitch, and wherein said second light pattern is a light pattern of a second pitch differing from said first pitch.

* * * * *